United States Patent
Baghel et al.

(10) Patent No.: US 10,349,442 B2
(45) Date of Patent: Jul. 9, 2019

(54) CROSS-CARRIER SCHEDULING FOR V2X COMMUNICATION

(71) Applicant: QUALCOMM Incorporated, San Diego, CA (US)

(72) Inventors: Sudhir Kumar Baghel, Hillsborough, NJ (US); Shailesh Patil, Raritan, NJ (US); Kapil Gulati, Dover, DE (US); Tien Viet Nguyen, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/587,346

(22) Filed: May 4, 2017

(65) Prior Publication Data

US 2018/0049235 A1    Feb. 15, 2018

Related U.S. Application Data

(60) Provisional application No. 62/374,729, filed on Aug. 12, 2016.

(51) Int. Cl.

| | |
|---|---|
| *H04W 72/14* | (2009.01) |
| *H04W 4/70* | (2018.01) |
| *H04W 72/04* | (2009.01) |
| *H04W 72/12* | (2009.01) |
| *H04W 76/14* | (2018.01) |
| *H04W 76/15* | (2018.01) |

(52) U.S. Cl.
CPC ............ *H04W 72/14* (2013.01); *H04W 4/70* (2018.02); *H04W 72/0453* (2013.01); *H04W 72/1289* (2013.01); *H04W 76/14* (2018.02); *H04W 76/15* (2018.02)

(58) Field of Classification Search
CPC ... H04W 72/0453; H04W 72/14; H04W 4/70; H04W 72/1289; H04W 76/14; H04W 76/15
See application file for complete search history.

(56) References Cited

U.S. PATENT DOCUMENTS

2015/0078279 A1 *  3/2015  Ko .................. H04W 76/14
                                         370/329
2015/0223075 A1    8/2015  Bashar et al.
(Continued)

FOREIGN PATENT DOCUMENTS

| WO | 2012166975 A1 | 12/2012 |
| WO | 2013108219 A1 | 7/2013 |

OTHER PUBLICATIONS

International Search Report and Written Opinion—PCT/US2017/041970—ISA/EPO—Oct. 18, 2017.

*Primary Examiner* — Charles C Jiang
*Assistant Examiner* — Rosene Clark
(74) *Attorney, Agent, or Firm* — Arent Fox LLP

(57) ABSTRACT

A cross-carrier scheduling scheme is provided. The cross-carrier scheduling scheme may improve the resource scheduling, for example, in V2X communication. The apparatus (e.g., a UE) receives a resource grant on a first carrier for a second carrier, the resource grant assigning resources for the second carrier. The apparatus communicates with a second UE via the second carrier using the granted resources. The apparatus may apply the resource grant based on at least one offset, such as an offset between the timing of the first carrier and timing of the second carrier.

27 Claims, 8 Drawing Sheets

(56) References Cited

U.S. PATENT DOCUMENTS

| | | | |
|---|---|---|---|
| 2016/0044619 A1* | 2/2016 | Ryu | H04W 76/14 |
| | | | 370/350 |
| 2017/0027013 A1* | 1/2017 | Kim | H04W 72/04 |
| 2018/0167904 A1* | 6/2018 | Lee | H04W 56/00 |
| 2018/0176891 A1* | 6/2018 | Kim | H04L 5/00 |

* cited by examiner

CROSS-CARRIER SCHEDULING FOR V2X COMMUNICATION

CROSS-REFERENCE TO RELATED APPLICATION(S)

This application claims the benefit of U.S. Provisional Application Ser. No. 62/374,729, entitled "CROSS-CARRIER SCHEDULING FOR LTE-BASED V2V COMMUNICATION" and filed on Aug. 12, 2016, which is expressly incorporated by reference herein in its entirety.

BACKGROUND

Field

The present disclosure relates generally to communication systems, and more particularly, to an equipment configured for vehicle-to-everything communication.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be configured to receive a resource grant on a first carrier for a second carrier, the resource grant assigning resources for the second carrier. The apparatus may communicate with a second UE via the second carrier using the granted resources. In an aspect, the resource grant assigns resources for the second carrier by indicating a number of channels on the second carrier. The apparatus may further receive information carried on a Physical Downlink Control Channel (PDCCH) on the first carrier, and the information carried on the PDCCH indicates the resource grant. The apparatus may further receive information indicating a plurality of indices and a mapping of the plurality of indices to a plurality of frequency bands for the second carrier. In an aspect, the information indicating the plurality of indices and the mapping is received via Radio Resource Control (RRC) signaling in response to the first UE indicating a start of vehicle-to-everything communication. In an aspect, at least a portion of the plurality of frequency bands for the second carrier corresponds to an Intelligent Transport System frequency spectrum for a sidelink carrier. In an aspect, the resource grant is received at an $n^{th}$ downlink subframe of the first carrier, the granted resources are valid for an $n^{th}+z$ offset+x offset subframe of the second carrier, the z offset is associated with a resource grant offset, and the x offset is associated with a timing offset between the first carrier and the second carrier. In an aspect, the x offset is associated with an offset between a System Frame Number (SFN) 0 of the first carrier and an SFN 0 of the second carrier. In an aspect, the apparatus may receive the x offset via RRC signaling. In an aspect, the apparatus may determine the x offset based on a timing offset between the first carrier and a global navigation satellite system (GNSS) time. In an aspect, the apparatus may determine the x offset based on a transmission time interval of the second carrier. In an aspect, the apparatus may receive a request for the x offset, and may provide the x offset via RRC signaling. In an aspect, the apparatus may autonomously provide the x offset via RRC signaling.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
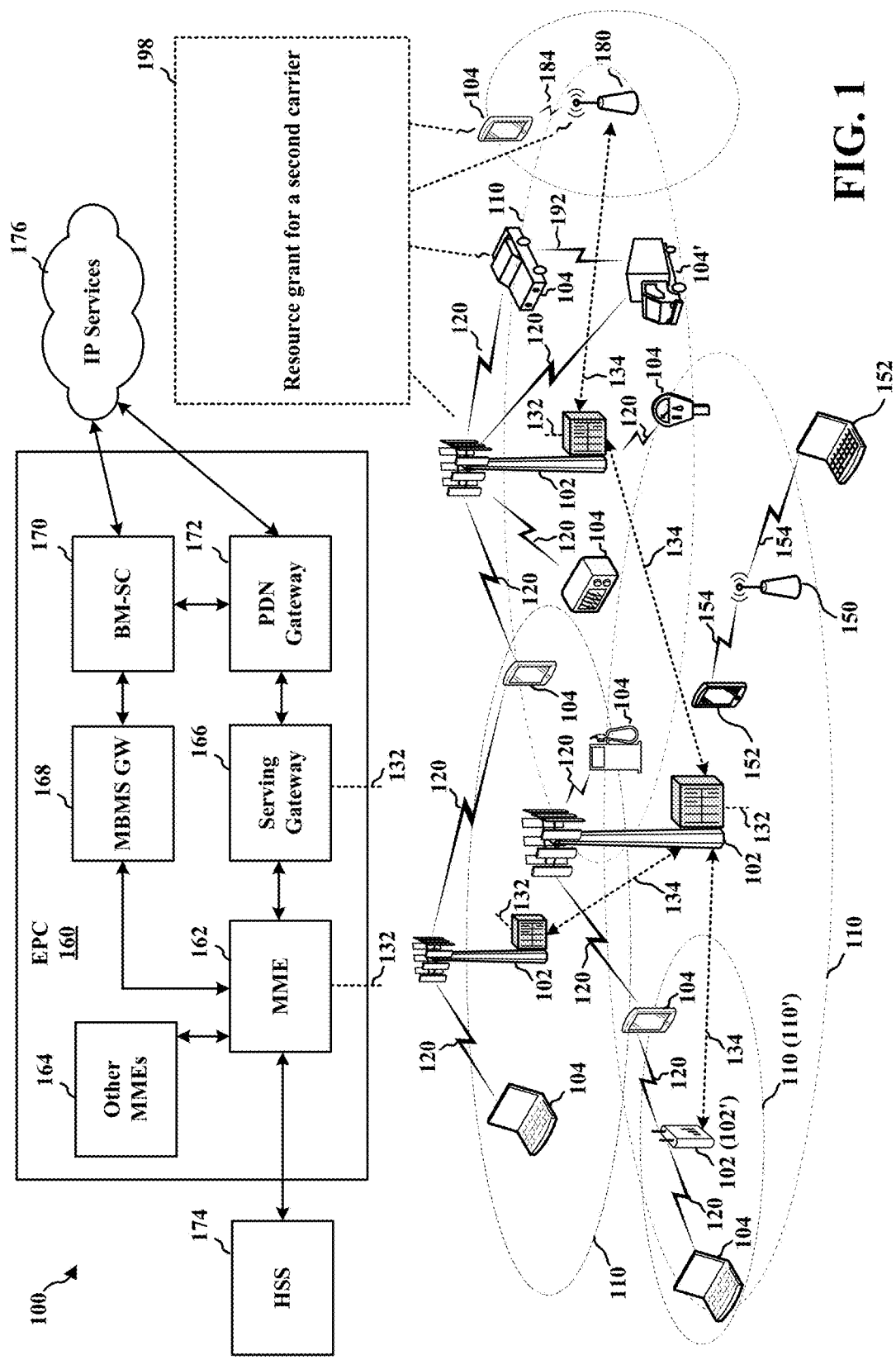
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include base stations. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The gNodeB (gNB) 180 may operate in millimeter wave (mmW) frequencies and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 104 to compensate for the extremely high path loss and short range.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a gNB, Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a toaster, or any other similar functioning device. Some of the UEs 104 may be referred to as IoT devices (e.g., parking meter, gas pump, toaster, vehicles, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to The UE 104 may be configured to receive a resource grant 198 on a first carrier for a second carrier, the resource grant assigning resources for the second carrier. For example, the UE 104 may receive the resource grant 198 from the base station 102, but the resource grant 198 may be applicable to a second carrier 192 (e.g., sidelink carrier) for vehicle-to-everything (V2X) communication with a second UE 104'. The UE 104 may communicate with a second UE 104' via the second carrier 192 using the granted resources. In an aspect, the resource grant 198 assigns resources for the second carrier 192 by indicating a number of channels on the second carrier 192. The UE 104 may further receive information carried on a Physical Downlink Control Channel (PDCCH) on the first carrier, and the information carried on the PDCCH indicates the resource grant. The UE 104 may further receive information indicating a plurality of indices and a mapping of the plurality of indices to a plurality of frequency bands for the second carrier 192. In an aspect, the information indicating the plurality of indices and the mapping is received via Radio Resource Control (RRC) signaling in response to the UE 104 indicating a start of V2X communication. In an aspect, at least a portion of the plurality of frequency bands for the second carrier 192 corresponds to an Intelligent Transport System frequency spectrum for a sidelink carrier. In an aspect, the resource grant 198 is received at an $n^{th}$ downlink subframe of the first carrier, the granted resources are valid for an $n^{th}$+z offset+x offset subframe of the second carrier, the z offset is associated with a resource grant offset, and the x offset is associated with a timing offset between the first carrier and the second carrier 192. In an aspect, the x offset is associated with an offset between a System Frame Number (SFN) 0 of the first carrier and an SFN 0 of the second carrier 192. In an aspect, the UE 104 may receive the x offset via RRC signaling. In an aspect, the UE 104 may determine the x offset based on a timing offset between the first carrier and a global navigation satellite system (GNSS) time. In an aspect, the UE 104 may determine the x offset based on a transmission time interval of the second carrier 192. In an aspect, the UE 104 may receive a request for the x offset (e.g., from the base station 102), and may provide the x offset via RRC signaling (e.g., to the base station 102). In an aspect, the UE 104 may autonomously provide the x offset via RRC signaling, e.g., to the base station 102.

FIG. 2A is a diagram 200 illustrating an example of a DL frame structure. FIG. 2B is a diagram 230 illustrating an example of channels within the DL frame structure. FIG. 2C is a diagram 250 illustrating an example of an UL frame structure. FIG. 2D is a diagram 280 illustrating an example of channels within the UL frame structure. Other wireless communication technologies may have a different frame structure and/or different channels. A frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). For a normal cyclic prefix, an RB contains 12 consecutive subcarriers in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as R5), and CSI-RS for antenna port 15 (indicated as R). FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (HACK) feedback based on the physical uplink shared channel (PUSCH). The primary synchronization channel (PSCH) may be within symbol 6 of slot 0 within subframes 0 and 5 of a frame. The PSCH carries a primary synchronization signal (PSS) that is used by a UE to determine subframe/symbol timing and a physical layer identity. The secondary synchronization channel (SSCH) may be within symbol 5 of slot 0 within subframes 0 and 5 of a frame. The SSCH carries a secondary synchronization signal (SSS) that is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DL-RS. The physical broadcast channel (PBCH), which carries a master information block (MIB), may be logically grouped with the PSCH and SSCH to form a synchronization signal (SS) block. The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the base station. The UE may additionally transmit sounding reference signals (SRS) in the last symbol of a subframe. The SRS may have a comb structure, and a UE may transmit SRS on one of the combs. The SRS may be used by a base station for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
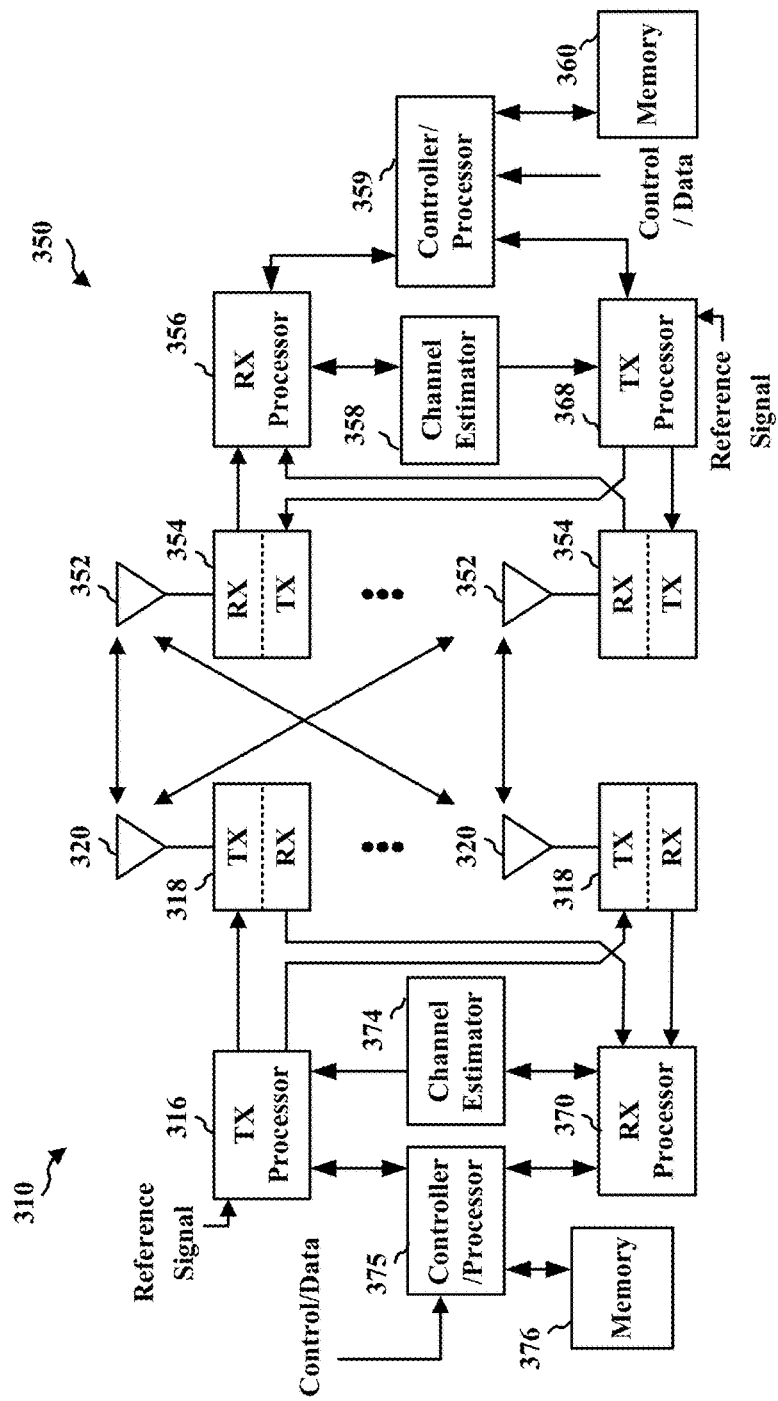
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 4:
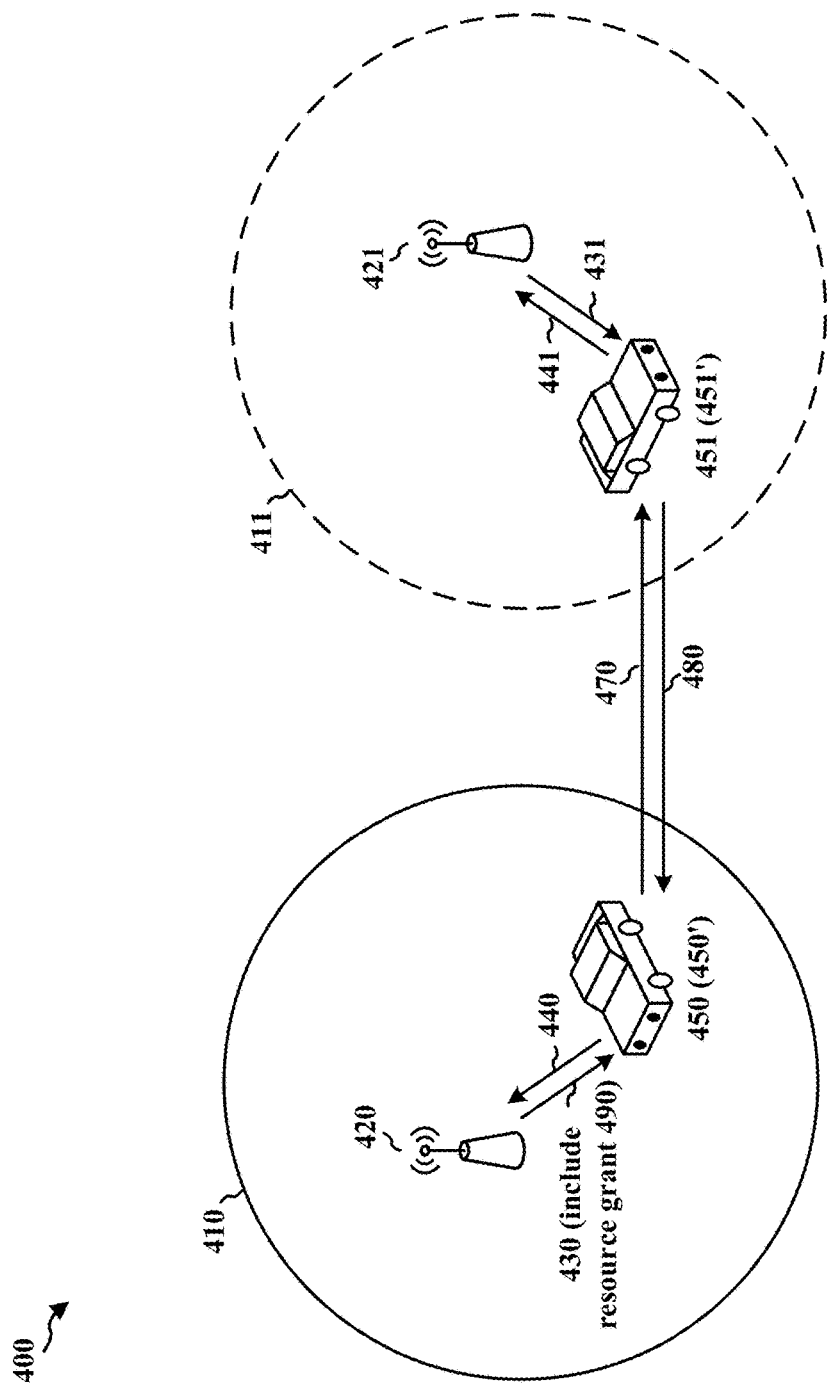
FIG. 4 is a diagram of a wireless communications system.

FIG. 4 is a diagram of a vehicle-to-everything communications system 400, which may include vehicle-to-vehicle (V2V) communications. The V2X communications system 400 may include a first vehicle 450'. In some aspects, the first vehicle 450' may be configured to communicate in a specific spectrum, such as an intelligent transport systems (ITS) spectrum. The ITS spectrum may be unlicensed, and therefore a plurality of different technologies may use the ITS spectrum for communication, including LTE, LTE-Advanced, Licensed Assisted Access (LAA), Dedicated Short Range Communications (DSRC), 5G, new radio (NR), 4G, and the like. The foregoing list of technologies is to be regarded as illustrative, and is not meant to be exhaustive.

The V2X communications system 400 may utilize LTE technology or another technology (e.g., 5G NR). For example, a vehicle in V2X communication may incorporate therein a UE of the LTE or 5G NR technology. In V2X communications, the vehicles 450', 451' may be on networks of different mobile network operators (MNOs). Each of the networks may operate in its own frequency spectrum. For example, the air interface to a first vehicle 450' (e.g., the Uu interface) may be on one or more frequency bands different from the air interface of the second vehicle 451'. The first vehicle 450' and the second vehicle 451' may communicate via a sidelink (e.g., via the PC5 interface). In some examples, the MNOs may schedule sidelink transmissions by the vehicles 450' 451' in V2X spectrum (e.g., V2V spectrum). An example of the V2X spectrum may include the intelligent transport system (ITS) frequency spectrum. The ITS spectrum may be unlicensed, and therefore a plurality of different technologies may use the ITS spectrum for communication, including LTE, LTE-Advanced, Licensed Assisted Access (LAA), Dedicated Short Range Communications (DSRC), 5G, new radio (NR), 4G, and the like. The foregoing list of technologies is to be regarded as illustrative, and is not meant to be exhaustive.

The V2X communications system 400 may be present where vehicles operate in networks of different MNOs and/or different frequency spectrums. Each of the vehicles in the V2X communications system may have a subscription from a respective corresponding MNO. The V2X spectrum may be shared with the frequency spectrums of the MNOs. In some examples, the V2X communications system 400 may be deployed where the first vehicle 450' operates in the network operated by a first MNO, and the second vehicle 451' is not in a network—e.g., the V2X spectrum may have no network deployed. The MNO or MNOs may control the V2X communication (e.g., assign resources, such as channels, frequency bands, and/or time slots) by sending assignment information to the corresponding vehicle via the Uu interface. Accordingly, the V2X communications system 400 may benefit from efficient carrier scheduling of resources for the V2X communications.

The first vehicle 450' may be in V2X (e.g., V2V) communication with the second vehicle 451'. The first vehicle 450' incorporates the first UE 450, and the second vehicle 451' incorporates the second UE 451. The first UE 450 may operate on a first network 410 (e.g., of the first MNO).

Figure 2:
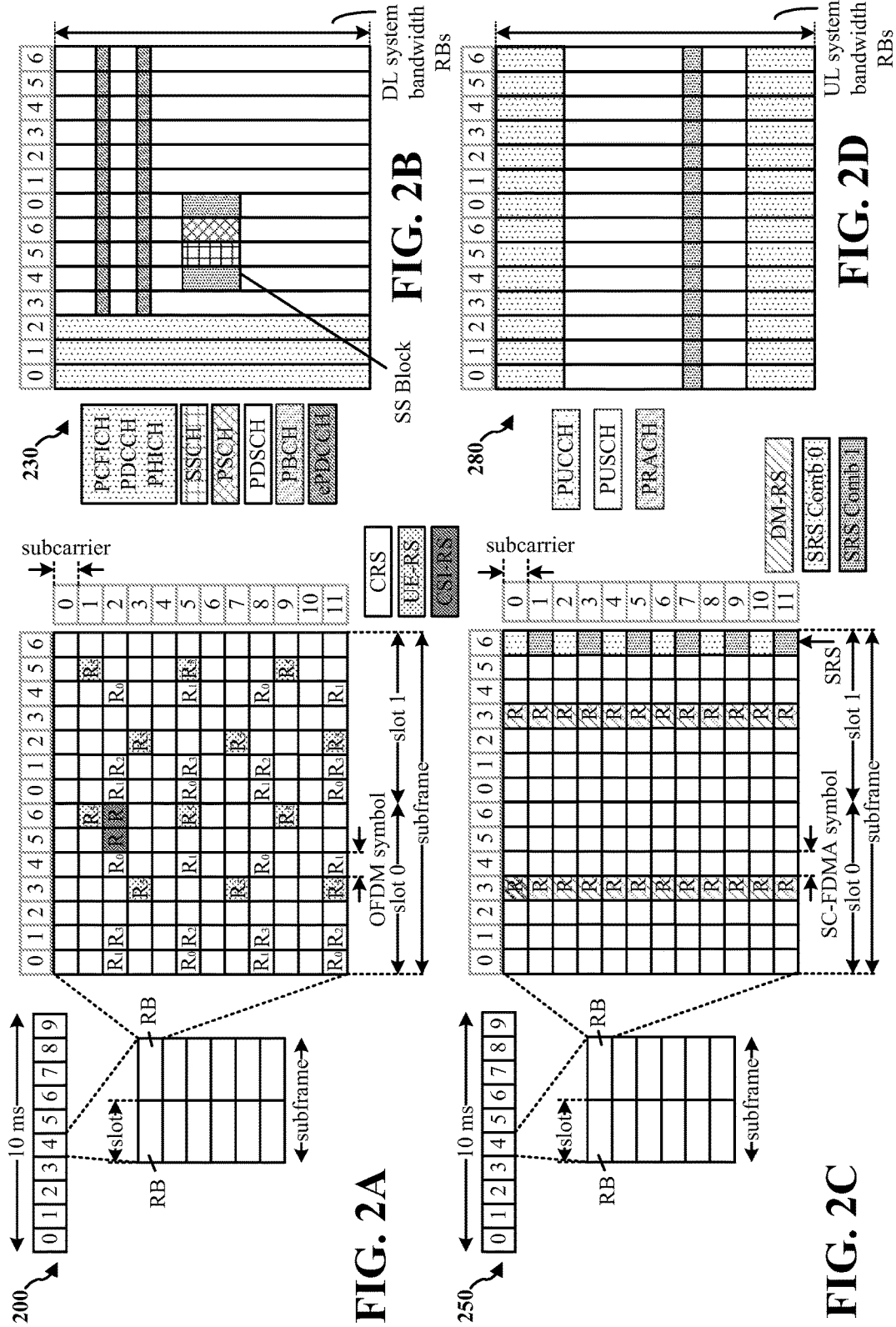
FIGS. 2A, 2B, 2C, and 2D are diagrams illustrating examples of a DL frame structure, DL channels within the DL frame structure, an UL frame structure, and UL channels within the UL frame structure, respectively.

The first network 410 may operate in a first frequency spectrum and includes the first base station 420 communicating with the first UE 450, for example, as described in FIGS. 1-3. The first base station 420 may communicate with the first UE 450 via a DL carrier 430 and/or an UL carrier 440. The DL communication may be performed via the DL carrier 430 using various DL resources (e.g., the DL subframes (FIG. 2A) and/or the DL channels (FIG. 2B)). The UL communication may be performed via the UL carrier 440 using various UL resources (e.g., the UL subframes (FIG. 2C) and the UL channels (FIG. 2D)).

In some aspects, the second UE 451 may not be on a network. In some aspects, the second UE 451 may be on a second network 411 (e.g., of the second MNO). The second network 411 may operate in a second frequency spectrum (e.g., a second frequency spectrum different from the first frequency spectrum) and may include the second base station 421 communicating with the second UE 451, for example, as described in FIGS. 1-3.

The second base station 421 may communicate with the second UE 451 via a DL carrier 431 and an UL carrier 441. The DL communication is performed via the DL carrier 431 using various DL resources (e.g., the DL subframes (FIG. 2A) and/or the DL channels (FIG. 2B)). The UL communication is performed via the UL carrier 441 using various UL resources (e.g., the UL subframes (FIG. 2C) and/or the UL channels (FIG. 2D)).

The V2X (e.g., V2V) communications may be carried out via sidelink carriers 470, 480. The sidelink carriers 470, 480 may include one or more channels, such as a physical sidelink broadcast channel (PSBCH), a physical sidelink discovery channel (PSDCH), a physical sidelink shared channel (PSSCH), and a physical sidelink control channel (PSCCH).

In some examples, the sidelink carriers 470, 480 may operate using the PC5 interface. The first UE 450 (incorporated in the first vehicle 450') may transmit to multiple devices, including to the second UE 451 (incorporated in the second vehicle 451') via the first sidelink carrier 470. The second UE 451 may transmit to multiple devices, including to the first UE 450 (incorporated in the vehicle 450') via the second sidelink carrier 480.

In some aspects, the UL carrier 440 and the first sidelink carrier 470 may be aggregated to increase bandwidth. In some aspects, the first sidelink carrier 470 and/or the second sidelink carrier 480 may share the first frequency spectrum (with the first network 410) and/or share the second frequency spectrum (with the second network 411). In some aspects, the sidelink carriers 470, 480 may operate in an unlicensed spectrum.

The exemplary methods and apparatuses discussed infra are applicable to any of a variety of wireless V2X communications systems. To simplify the discussion, the exemplary methods and apparatus may be discussed within the context of LTE. However, one of ordinary skill in the art would understand that the exemplary methods and apparatuses are applicable more generally to a variety of other wireless V2X communication systems, including 5G.

In one aspect, one of the carriers in the V2X communications system 400 may be utilized to assign resources to the first sidelink carrier 470 and/or the second sidelink carrier 480. For example, the first UE 450 may receive a resource grant 490 on a first carrier (e.g., the DL carrier 430) for the first sidelink carrier 470. The resource grant 490 assigns resources for the first sidelink carrier 470. In one aspect, the resource grant 490 may be carried on a PDCCH.

In one aspect, the first UE 450 may receive the resource grant 490 in a DCI message that indicates the granted resources (e.g., DCI format 0 or another DCI format). For example, a cyclic shift for DM-RS and be used to indicate a semi-persistent scheduling (SPS) configuration index for V2X (e.g., UL V2X). In another aspect, one or more bits (e.g., 3 bits) of the DCI message may indicate to the first UE 450 an SPS configuration index. The first UE 450 may be configured to determine assigned resources based on a configuration index.

In one aspect, the first base station 420 may signal, to the first UE 450 via the DL carrier 430, information indicating one or more indices that correspond to one or more frequency bands (e.g., one or more frequency bands in an ITS frequency spectrum) for the first sidelink carrier 470 and/or the second sidelink carrier 480. The first UE 450 may be configured to determine a respective frequency band that corresponds to a respective index of the indices, and the first UE 450 may determine the assigned resources as including the one or more frequency bands that respectively correspond to the one or more indices. In an aspect, the first UE 450 may access a mapping that maps a respective index to a respective frequency band, and the first UE 450 may determine a respective frequency band that maps to a respective index indicated by the resource grant. In one aspect, the first UE 450 may receive the mapping from the first base station 420 via the DL carrier 430.

In an aspect, the first UE 450 may receive the information indicating the one or more indices that correspond to one or more frequency bands for the first sidelink carrier 470 and/or the second sidelink carrier 480 via RRC signaling (and, optionally, the mapping that maps a respective index to a respective frequency band). For example, the first UE 450 may start V2X communication (e.g., with the second UE 451), and the first UE 450 may indicate the start of V2X communication to the first base station 420. Based on the indicated start of V2X communication, the first base station 420 may transmit, to the first UE 450, information indicating the one or more indices that correspond to one or more frequency bands for the first sidelink carrier 470 and/or the second sidelink carrier 480 via RRC signaling (and, optionally, the mapping that maps a respective index to a respective frequency band).

Based on the resource grant 490, the first UE 450 may determine a resource assignment based on an indication included in the resource grant 490. The first UE 450 may accordingly communicate with the second UE 451 via the first sidelink carrier 470 using the assigned resources. The resource grant 490 may indicate resources such as frequency bands, time slots, RBs, and/or channels for the first sidelink carrier 470 (see, for example, the resources described in FIG. 2). Thus, the first UE 450 may determine a resource assignment that includes at least one frequency band(s), time slot(s), RB(s), and/or channel(s). For example, the first UE 450 may determine a number of channels on the first sidelink carrier 470 and/or the second sidelink carrier 480.

The assigned resources may share the first frequency spectrum with the first network 410, share the second frequency spectrum in the second network 411, correspond to the ITS frequency spectrum, and/or be in the unlicensed frequency spectrum.

In an aspect, the first UE 450 may be configured to determine one or more subframes for which the assigned resources are valid. In other words, the first UE 450 may determine one or more subframes during which the first UE 450 is to communicate via the first sidelink carrier 470 and/or the second sidelink carrier 480 using the assigned resources. In one aspect, the first UE 450 may determine the one or more subframes for the first sidelink carrier 470 and/or the second sidelink carrier 480 based on the subframe in which the resource grant 490 is received via the DL carrier 430.

According to an aspect, the first UE 450 may receive the resource grant 490 in an $n^{th}$ subframe, and the first UE 450 may determine that the resource assignment is valid for the $n^{th}$+at least one offset. The at least one offset may include a resource grant offset, such as one or more milliseconds (ms) to adjust for delay(s). In one aspect, the resource grant offset may be one or more subframes (e.g., four subframes). The first UE 450 may determine the resource grant offset (e.g., based on network signaling and/or based on observation of subframes carried in the DL carrier 430 or UL carrier and subframes carried on the first sidelink carrier 470 and/or the second sidelink carrier 480. The first UE 450 may apply the resource grant offset to the $n^{th}$ subframe of the first sidelink carrier 470 and/or the second sidelink carrier 480 (even through the resource grant 490 is received in the DL carrier 430).

The at least one offset may include an timing offset to account for a timing difference between the timing (e.g., subframes) of the DL carrier 430 or UL carrier and timing (e.g., subframes) of the first sidelink carrier 470 and/or the second sidelink carrier 480. In one aspect, the timing offset may account for an offset between a SFN 0 associated with the DL carrier 430 or UL carrier and an SFN 0 associated with the first sidelink carrier 470 and/or the second sidelink carrier 480. The first UE 450 may determine the timing offset based on receiving an indication of the timing offset via RRC signaling (e.g., from the first base station 420).

In another aspect, the first UE 450 may determine the timing offset based on GNSS (e.g., timing based on the Global Positioning System). For example, timing (e.g., subframes) of the first sidelink carrier 470 and/or the second sidelink carrier 480 may be synchronized to GNSS timing, and the first UE 450 may determine an offset between the GNSS timing and the DL carrier 430 and/or the UL carrier 440. In one aspect, the first UE 450 may, based on the resource grant 490, synchronize the timing differences among the timings of the first network 410, the second network 411, and/or the GNSS.

In an example, the first UE 450 may determine the timing offset based on one or more transmission time intervals (TTIs) of the first sidelink carrier 470 and/or the second sidelink carrier 480 and TTIs of the DL carrier 430 and/or the UL carrier 440. Accordingly, the timing offset may account for a different between a timing difference between the DL carrier 430 and/or the UL carrier 440 and the first sidelink carrier 470 and/or the second sidelink carrier 480. In one aspect, the TTIs of the first sidelink carrier 470 may be synchronized to GNSS timing.

The first UE 450 may apply the resource grant offset and the timing offset to the $n^{th}$ subframe of the first sidelink carrier 470 and/or the second sidelink carrier 480 (n being the subframe of the DL carrier 430 on which the resource grant 490 is received). Accordingly, the first UE 450 may utilize the assigned resources for the first sidelink carrier 470 and/or the second sidelink carrier 480 beginning at an $n^{th}$+z+x subframe, where z is the resource grant offset and x is the timing offset.

In one aspect, the first UE 450 may signal the timing offset to the first base station 420. For example, the first UE 450 may receive, from the first base station 420, a request for the timing offset. Based on the request, the first UE 450 may signal the timing offset to the first base station 420. In another aspect, the first UE 450 may signal the timing offset to the first base station 420 without receiving a request. For example, the first UE 450 may signal the timing offset to the first base station 420 via RRC signaling.

Based on the assigned resources, the first UE 450 may communicate with the second UE 451. For example, the first UE 450 may communicate via the first sidelink carrier 470 on the assigned resources with the second UE 451 and/or the first UE 450 may communicate via the second sidelink carrier 480 with the second UE 451.

In some aspects, each MNO may manage a set of RBs (e.g., statically allocated RBs) to avoid conflicts. In some examples, an MNO may announce sets of RBs (e.g., resource pools) to the UEs (e.g., the first UE 450 and/or the second UE 451) for V2X communications. In some aspects, the UEs 450, 451 in the V2X communication may need to monitor all the resources (e.g., all resources announced by a respective MNO on which a UE operates).

Figure 5:
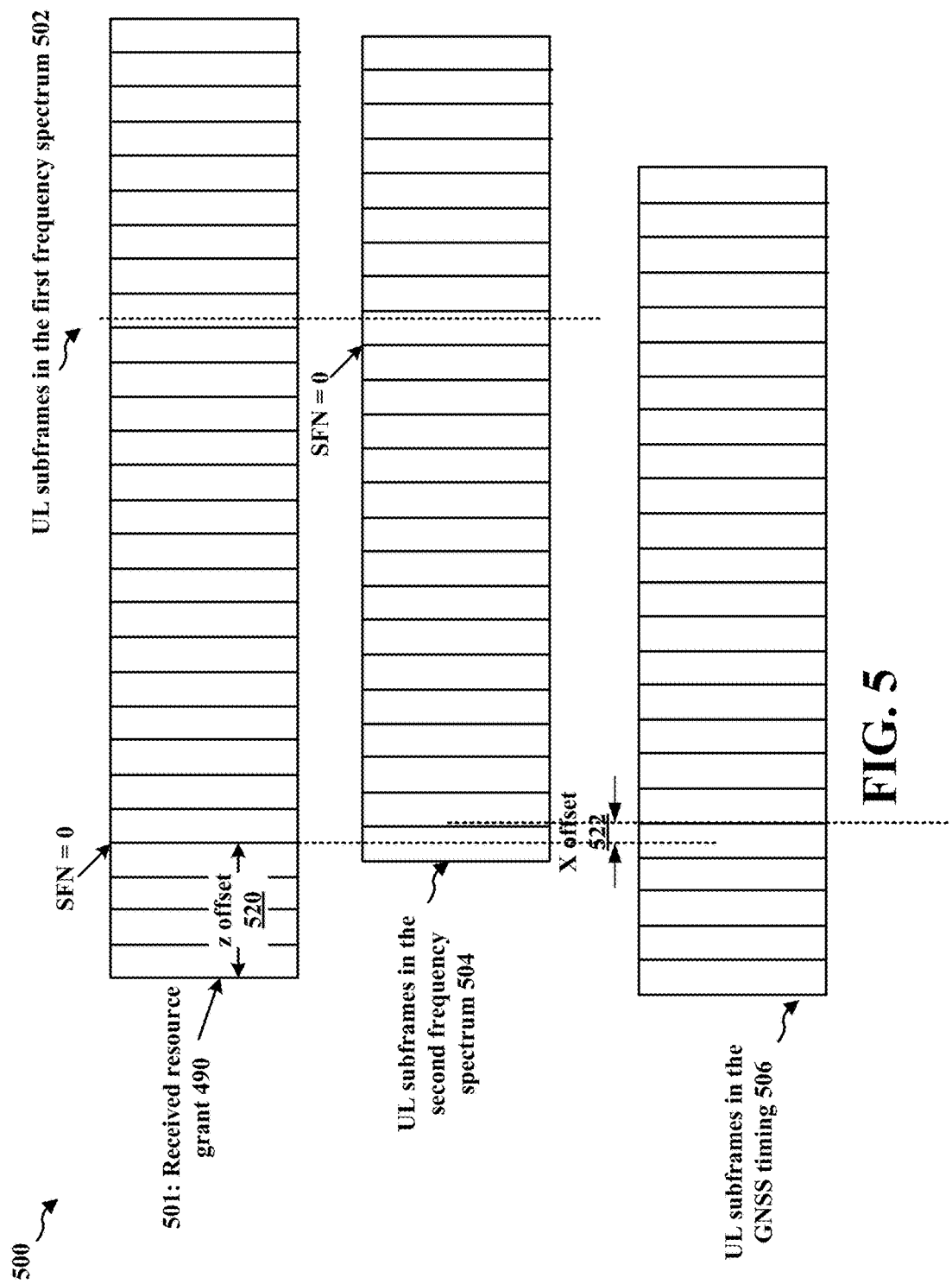
FIG. 5 is a diagram of a wireless communications system.

FIG. 5 illustrates a diagram 500 of the subframes on different frequency spectrums. The diagram 500 includes the subframes 502 of the first frequency spectrum (e.g., of the first network 410), the subframes 504 of the second frequency spectrum (e.g., of the second network 411), and the subframes 506 of the GNSS timing. The V2X communications may operate using the subframes 506 and may be on the GNSS timing. The subframes 502, 504, and 506 may be UL subframes.

The diagram 500 may depict timing offsets between the start of a subframe in a network (e.g., subframes 502 or subframes 504) and the start of a subframe 506 in GNSS timing. For example, the timing offset may be the difference between the start of the subframe of SFN 0 (e.g., of the subframes 502) and a start of a subframe of the subframes 506 (e.g., as illustrated by the dotted line). The timing offset may remain relatively fixed as the network timing drift may be small. Since the first UE 450 may be synchronized to the first network 410 as well as the GNSS timing, the first UE 450 may be aware of the timing offset.

In a case that the first network 410 schedules or assigns the resources for the first sidelink carrier 470 (e.g., assigning the V2V frequency spectrum), the first UE 450 may receive the resource grant 490 at the $n^{th}$ DL subframe provided by the DL carrier 430. The first UE 450 may apply the resource grant 490 to an UL transmission or V2X transmission after few ms or a few subframes later to account for various delays. In FIG. 5, such a resource grant offset is may be designated z offset 520, and in some examples, the uplink delay may be four subframes. For example, at 501, the first UE 450 receives the resource grant 490 at SFN 0 of the DL subframes. In the illustrated example, after the z offset 520 (e.g., four subframes), the first UE 450 may apply the granted and assigned resources at the subframes 502.

However, the resource grant offset or z offset 520 may not account for the timing offset between the subframes of the first network 410 and the GNSS time. Nor does the z offset account for the timing offset between the subframes of the first network 410 and the assigned V2X communication. As presented above, the assigned V2X communication frequency spectrum may be, for example, shared with the frequency spectrum of the second network 411 (e.g., the subframes 504).

Functions and operations (e.g., to be performed by the first UE 450) as described in the present disclosure may efficiently schedule or assign resources for the V2X communication by, for example, addressing the timing offsets presented above. In one aspect, the first network 410 (e.g., via the first base station 420) conveys to the first UE 450 the resource grant 490 via the DL carrier 430 (e.g., using the Uu interface). The resource grant 490 may indicate at least one of RBs, frequency bands, time slots, and/or a number of channels for the first sidelink carrier 470 (e.g., using the PC5 interface). The resource grant 490 may be included in the PDCCH (conveying the resource grant 490) received by the first UE 450.

In one aspect, the first UE 450 may receive information (e.g., as part of the resource grant 490) including multiple indices and/or a mapping of the multiple indices to a multiple frequency bands for the first sidelink carrier 470. In some examples, the first UE 450 may receive the indices and/or mapping information via an RRC signaling. In some examples, the first UE 450 may indicate to the first network 410 a start of the V2X communication, and in response, the first network 410 provides RRC signaling to convey the indices and/or mapping information. In one aspect, at least a portion of the assigned frequency bands corresponds to the ITS frequency spectrum.

In one aspect, the first UE 450 may apply the assigned resources at a subframe of the V2X communication by adding an offset in addition to the z offset 520 to account for the timing offsets presented in FIG. 5. For example, the first UE 450 may receive the resource grant 490 at an $n^{th}$ downlink subframe of the DL carrier 430. The first UE 450 may determine that the granted resources are valid for an $n^{th}$+z offset 520+x offset 522 subframe of the first sidelink carrier 470. Referring to FIG. 5, the z offset 520 may be a resource grant offset and may be four subframes. In one example, the x offset 522 may account for a timing offset between the DL carrier 430 and the first sidelink carrier 470.

In one aspect, the first UE 450 may provide the x offset 522 to the first network 410 by providing the x offset 522 to the first base station 420 via the UL carrier 440 and in some examples, via an RRC signaling (e.g., as an RRC message). The first network 410 may use the x offset 522 to coordinate with, for example, the second network 411 for the V2X communications. For example, the first base station 420 may receive the x offset 522 from the first UE 450 and the first base station 420 may signal the x offset 522 to the second base station 421 (e.g., via a backhaul link, the X2 interface, etc.).

In some examples, the first base station 420 provides a request to the first UE 450 for the x offset 522. In response to receiving the request, the first UE 450 may provide the x offset 522, for example, via RRC signaling to the first base station 420. In some examples, the first UE 450 may autonomously provide the x offset 522 in RRC signaling (e.g., without a request for the x offset).

In one aspect, the first base station 420 may provide the x offset 522 to the first UE 450 via the DL carrier 430, for example, instead of the first UE 450 determining the x offset 522. In one aspect, the first base station 420 may provide to the first UE 450 (e.g., via the DL carrier 430) a list of ITS frequency bands and an index for each frequency band via RRC signaling (e.g., in an RRC configuration message).

When the first base station 420 assigns resources from on carrier (e.g., the UL carrier 440) to the first sidelink carrier 470 (or the second sidelink carrier 480), such an assignment may be indicated on PDCCH (e.g., enhanced PDCCH). In one aspect, the second network 411, the second base station 421, and the second UE 451 may perform the functions presented above to assign resources for the second sidelink carrier 480. For example, the second UE 451 may determine the x offset 522 for the second sidelink carrier 480 as presented above.

Figure 6:
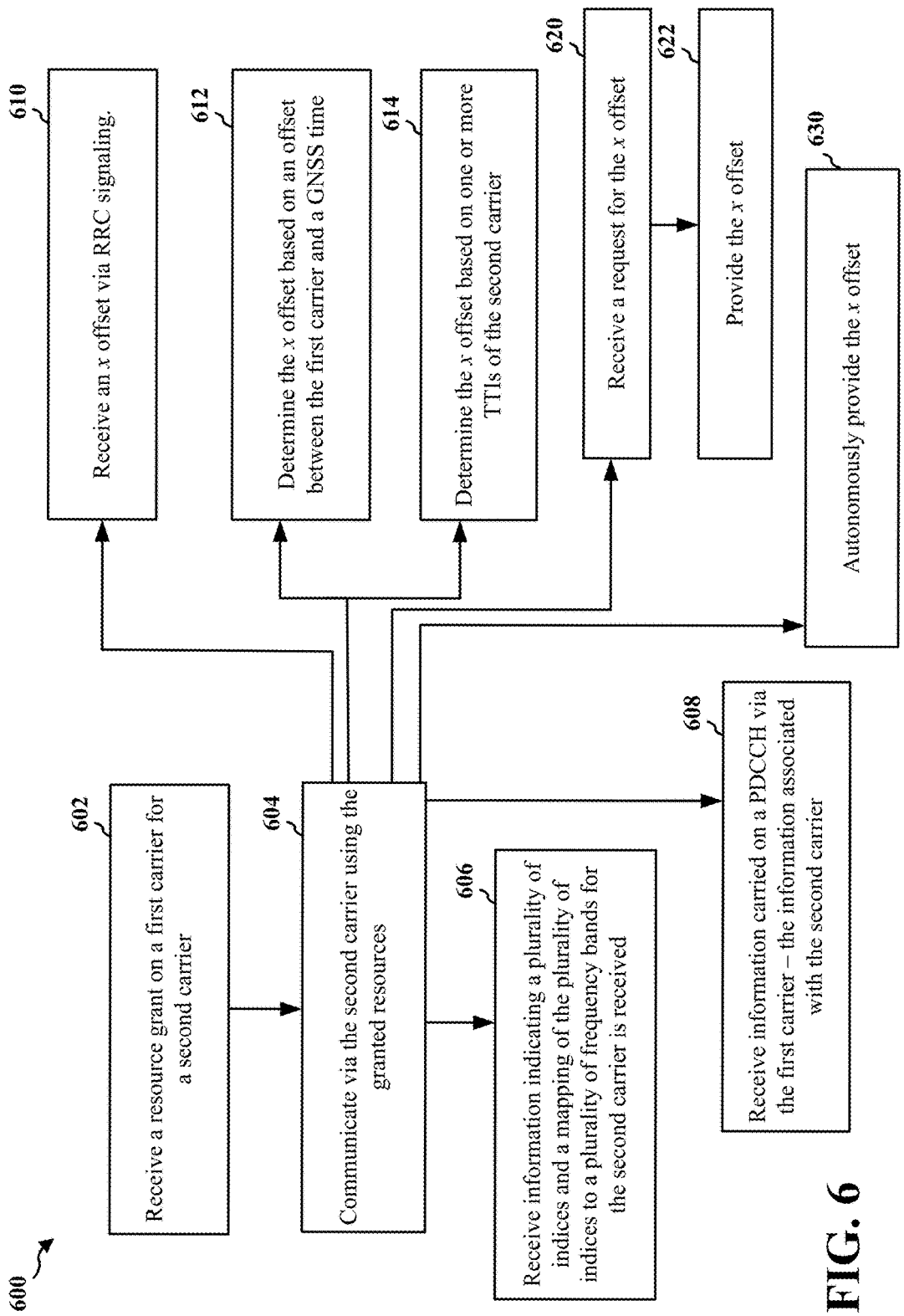
FIG. 6 is a flowchart of a method of wireless communication.

FIG. 6 is a flowchart of a method 600 of wireless communication. The method 600 may be performed by a UE (e.g., the first UE 450). The method 600 may include operations presented with respect to FIGS. 4 and 5. According to different aspects, one or more operations may be added, transposed, and/or removed.

Beginning at operation 602, the UE may receive a resource grant on a first carrier for a second carrier. For example, the UE may receive information indicating one or more resources that the UE may use for V2X communication, and the UE may determine a resource assignment based on the indication of the one or more resources. In an aspect, the UE may receive the information indicating the one or more resources from an MNO with which the UE is associated. In the context of FIG. 4, the first UE 450 may receive the resource grant 490 on the DL carrier 430 for the first sidelink carrier 470.

At operation 604, the UE may communicate via the second carrier using the granted resources. For example, the UE may determine or select data that is to be transmitted to another UE, and the UE may transmit that data to the other UE on the granted resources (e.g., on a sidelink channel associated with V2X communication). In the context of FIG. 4, the first UE 450 may communicate with the second UE 451 via the first sidelink carrier 470 based on the resource grant 490.

According to various aspects, one or more operations 606, 608, 610, 612, 614, 620, 622, and/or 630 may be performed. One or more of these operations 606, 608, 610, 612, 614, 620, 622, and/or 630 may be performed at various times according to various aspects. For example, operation 610 may occur before operation 604 in one aspect. Additionally, one or more of these operations 606, 608, 610, 612, 614, 620, 622, and/or 630 may be absent. For example, when operation 610 is performed, operation 630 may be absent.

At operation 606, the UE may receive information that indicates at least a plurality of indices, and each index may correspond to a frequency band associated with the second carrier. In an aspect, the UE may additionally receive a mapping of the plurality of indices to a plurality of frequency bands associated with the second carrier. In one aspect, the UE may receive the information indicating at least the plurality of indices as part of a resource grant (e.g., as described at operation 602). In an aspect, the information indicating at least the plurality of indices may be received via RRC signaling.

The UE may determine the plurality of frequency bands based on the plurality of indices. For example, the UE may access the mapping of the plurality of indices to the plurality of frequency bands and, for each index of the plurality of indices, the UE may determine a respective frequency band that corresponds to a respective index using the mapping. In an aspect, the UE may determine one or more assigned resources based on the frequency bands (e.g., the UE may communicate with the other UE in the one or more frequency bands corresponding to the one or more indices).

In the context of FIG. 4, the first UE 450 may receive information (e.g., as part of the resource grant 490) indicating one or more indices and/or a mapping of the a respective index to a respective frequency band. The one or more frequency bands corresponding to the one or more indices may be determined by the UE to be used for the first sidelink carrier 470. In some examples, the first UE 450 may receive the indices and/or mapping information via an RRC signaling.

At operation 608, the UE may receive, on a PDCCH via the first carrier, information associated with the second carrier. For example, the UE may receive information carried on a PDCCH via a DL carrier (e.g., an LTE carrier, a 5G NR carrier, etc.), and the information may be applicable to a sidelink carrier (e.g., a sidelink carrier for V2X communication). In one aspect, the UE may receive the control information via the first carrier, determine that the control information is applicable to the second carrier, and apply the control information to the second carrier. In one aspect, the information associated with the second carrier may be information indicating a resource assignment for the second carrier—e.g., the information may be a resource grant for a sidelink carrier, as described at operation 602. In the context of FIG. 4, the first UE 450 may receive, on a PDDCH via the DL carrier 430, information associated with the first sidelink carrier 470. In some examples, the first network 410 (e.g., via the first base station 420) conveys to the first UE 450 the resource grant 490 via the DL carrier 430 (using the Uu interface). The resource grant 490 may indicate the RBs, frequency bands, time slots, and a number of channels for the first sidelink carrier 470. The resource grant 490 may be included in the PDCCH (conveying the resource grant 490) received by the first UE 450.

At operation 610, the UE may receive an x offset via RRC signaling. The x offset may be a timing offset. For example, the x offset may account for an offset between timing (e.g., subframes) of the first carrier and a GNSS timing (e.g., the timing of the second carrier may be synchronized with the GNSS timing). In one aspect, the x offset may account for an offset between timing of the first carrier and timing (e.g., subframes) of the second carrier—e.g., the x offset may account for timing offset between subframes of the Uu interface (e.g., associated with the first carrier) and subframes of the PC5 interface (e.g., associated with the second carrier). In aspects, the UE may receive the x offset and apply the offset to timing (e.g., subframes) of the second carrier. For example, the UE may apply the assigned resources for the second carrier based on the x offset (e.g., the resource grant may be received in the nth subframe and the UE may apply at least the x offset before communicating on the assigned resources). In the context of FIG. 4, the first UE 450 may receive, from the first base station 420 via RRC signaling, the x offset and the first UE 450 may apply the offset to the communication via the first sidelink carrier 470. In the context of FIG. 5, the first UE 450 may receive the x offset 522 via RRC signaling, and the first UE 450 may apply the x offset to assigned resources (e.g., assigned resources determined based on the resource grant 490) during at least a portion of the subframes 506, for example, for communication with the second UE 451 on at least the first sidelink carrier 470.

At operation 612, the UE may determine the x offset based on a timing offset between the first carrier and a GNSS time. The x offset may be a timing offset. For example, the x offset may account for an offset between timing (e.g., subframes) of the first carrier and a GNSS timing (e.g., the timing of the second carrier may be synchronized with the GNSS timing). In one aspect, the x offset may account for an offset between timing of the first carrier and timing (e.g., subframes) of the second carrier—e.g., the x offset may account for timing offset between subframes of the Uu interface (e.g., associated with the first carrier) and subframes of the PC5 interface (e.g., associated with the second carrier). In aspects, the UE may determine the x offset by determining timing (e.g., subframes) of the first carrier, and, additionally, determining GNSS timing. The UE may determine the timing of the first carrier in relation to GNSS time, such as by determining a time frame of the GNSS time at which a start of a subframe of the first carrier occurs. The UE may apply the x offset to timing (e.g., subframes) of the second carrier. For example, the UE may apply the assigned resources for the second carrier based on the x offset (e.g., the resource grant may be received in the nth subframe and the UE may apply at least the x offset before communicating on the assigned resources). In the context of FIG. 4, the first UE 450 may determine a timing offset between GNSS time and timing (e.g., subframes) of the DL carrier 430 and/or the UL carrier 440, and the first UE 450 may apply the offset to the communication via the first sidelink carrier 470. In the context of FIG. 5, the first UE 450 may determine the x offset 522 by comparing subframes 502 associated with the first network 410 to subframes 506 that are synchronized with GNSS time and determining a difference between a start of the subframes 502, 506. The first UE 450 may apply the x offset to assigned resources (e.g., assigned resources determined based on the resource grant 490) during at least a portion of the subframes 506, for example, for communication with the second UE 451 on at least the first sidelink carrier 470.

At operation 614, the UE may determine the x offset based on TTIs of the second carrier. The x offset may be a timing offset. For example, the x offset may account for an offset between timing (e.g., subframes) of the first carrier and a GNSS timing (e.g., the timing of the second carrier may be synchronized with the GNSS timing). In one aspect, the x offset may account for an offset between timing of the first carrier and timing (e.g., subframes) of the second carrier—e.g., the x offset may account for timing offset between subframes of the Uu interface (e.g., associated with the first carrier) and subframes of the PC5 interface (e.g., associated with the second carrier). In aspects, the UE may determine the x offset by determining timing (e.g., subframes) of the first carrier, and, additionally, determining TTIs (e.g., subframes, slots, etc.) of the second carrier. The UE may determine the timing of the first carrier in relation to second carrier, such as by determining a time difference between a start of a subframe of the first carrier and a TTI of the second carrier. The UE may apply the x offset to timing (e.g., subframes) of the second carrier. For example, the UE may apply the assigned resources for the second carrier based on the x offset (e.g., the resource grant may be received in the nth subframe and the UE may apply at least the x offset before communicating on the assigned resources). In the context of FIG. 4, the first UE 450 may determine a timing offset between timing of at least the first sidelink carrier 470 and timing (e.g., subframes) of the DL carrier 430 and/or the UL carrier 440, and the first UE 450 may apply the offset to the communication via the first sidelink carrier 470. In the context of FIG. 5, the first UE 450 may determine the x offset 522 by comparing subframes 502 associated with the first network 410 to subframes 506 during which V2X communication may occur and determining a difference between a start of the subframes 502, 506. The first UE 450 may apply the x offset to assigned resources (e.g., assigned resources determined based on the resource grant 490) during at least a portion of the subframes 506, for example, for communication with the second UE 451 on at least the first sidelink carrier 470.

At operation 620, the UE may receive a request for the x offset. For example, the UE may receive a request for the x offset determined according to operation 612 and/or operation 614. In an aspect, the UE may receive the request for the x offset from a base station associated with an MNO. In an aspect, the UE may receive the request via RRC signaling. In the context of FIG. 4, the first UE 450 may receive, from the first base station 420 (e.g., via the DL carrier 430), a request for the x offset. In the context of FIG. 5, the first UE 450 may determine the x offset 522 and receive a request for the x offset.

At operation 622, the UE may provide the x offset. For example, the UE may identify an offset indicated by the request, and then the UE may transmit the identified x offset based on the request. In an aspect, the UE may transmit an indication of the x offset, for example, via an RRC message. In the context of FIG. 4, the first UE 450 may identify the x offset based on the request from the first base station 420, and the first UE 450 may indicate the x offset to the first base station (e.g., via the UL carrier 440, via an RRC message, etc.). In the context of FIG. 5, the first UE 450 may indicate the x offset 522 to the first base station 420.

At operation 630, the UE may autonomously provide the x offset. In other words, the UE may indicate the x offset to a base station without receiving a request. For example, the UE may identify the x offset, the UE may determine that the x offset is to be provided to a base station (e.g., based on determination or identification of the x offset), and then the UE may transmit the identified x offset. In an aspect, the UE may transmit an indication of the x offset, for example, via an RRC message. In the context of FIG. 4, the first UE 450 may identify the x offset, and the first UE 450 may indicate the x offset to the first base station (e.g., via the UL carrier 440, via an RRC message, etc.). In the context of FIG. 5, the first UE 450 may indicate the x offset 522 to the first base station 420.

Figure 7:
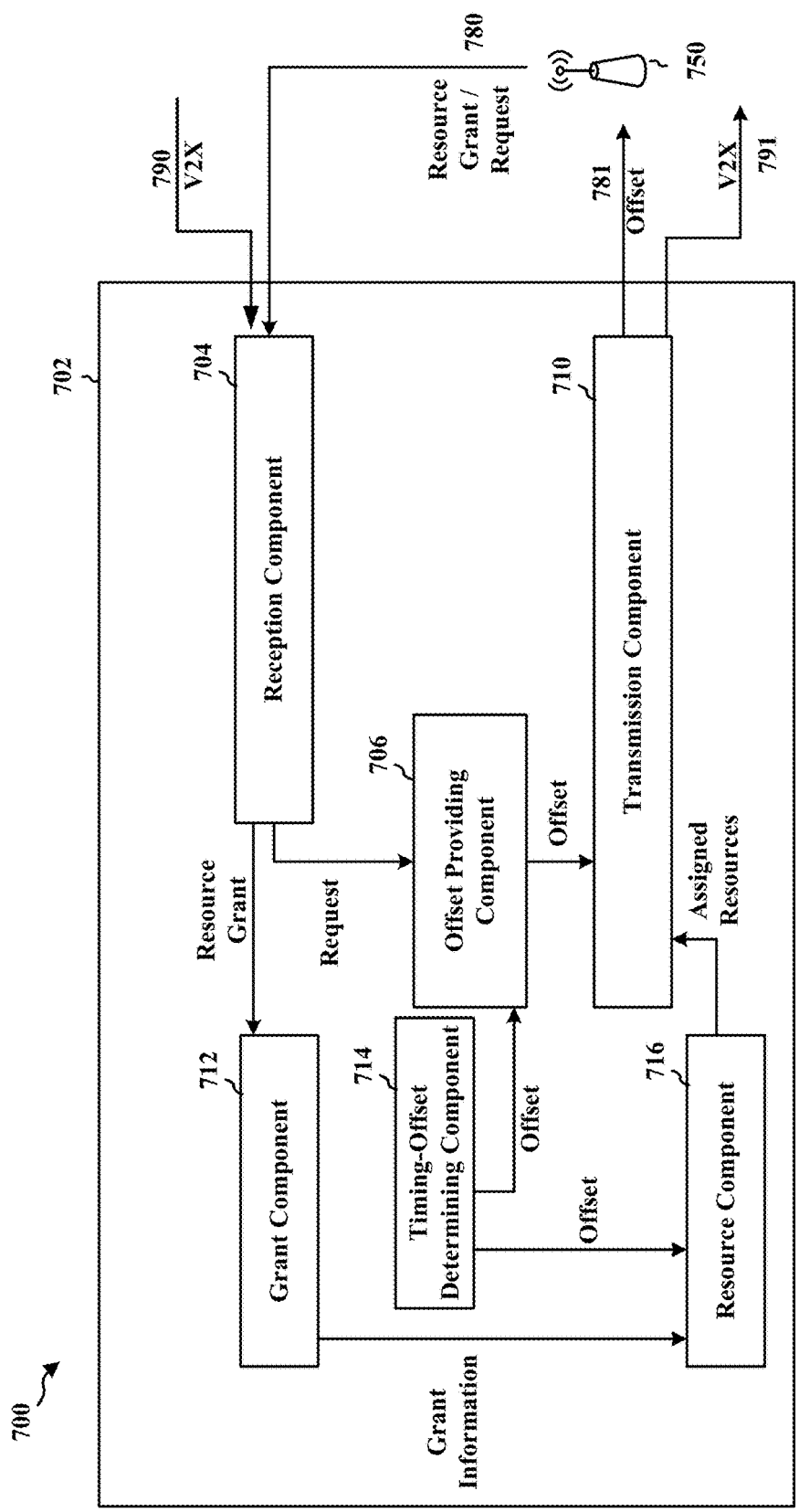
FIG. 7 is a conceptual data flow diagram illustrating the data flow between different means/components in an exemplary apparatus.

FIG. 7 is a conceptual data flow diagram 700 illustrating the data flow between different means/components in an exemplary apparatus 702. The apparatus 702 may be a UE.

The apparatus includes a reception component 704 that receives signaling from a base station 750 (e.g., via a DL carrier 780). The reception component 704 may further receive signaling via a first sidelink carrier 790, such as V2X signaling from another UE. In an aspect, the reception component 704 may be configured to receive information carried on a PDCCH via the DL carrier 780. The reception component 704 may be configured to receive a resource grant on the DL carrier 780 for the second sidelink carrier 791. The reception component 704 may further be configured to receive a timing offset, such as an x offset. The reception component 704 may receive signaling (e.g., the x offset, a request for the x offset) via RRC signaling. The reception component 704 may be further configured to receive a request for the x offset.

The apparatus 702 may include a transmission component 710. The transmission component may transmit signals via an UL carrier 781 (e.g., to the base station 750). The transmission component 710 may be further configured to transmit signals via a second sidelink carrier 791, for example, in association with V2X communication with another UE.

In aspects, the apparatus 702 may include an offset providing component 706 that, in conjunction with the transmission component 710, may provide an x offset with a request, and in some aspects, provides the x offset without a request. In an aspect, the offset providing component 706 may receive the x offset from the timing-offset determining component 714.

The apparatus 702 may include a grant component 712 that, in conjunction with the reception component 704, receives information indicating a resource grant. In an aspect, the grant component 712 may be configured to determine one or more assigned resources for V2X communication (e.g., on the second sidelink carrier 791) based on the resource grant from the base station 750. In one aspect, the grant component 712 may receive information indicating a plurality of indices and/or a mapping of the plurality of indices to a plurality of frequency bands for the second sidelink carrier 791. In an aspect, the grant component 712 may receive the information indicating a plurality of indices and/or a mapping of the plurality of indices to a plurality of frequency bands via the DL carrier 780. The grant component 712 may apply the information indicating a plurality of indices and/or a mapping of the plurality of indices to a plurality of frequency bands to the second sidelink carrier 791. The grant component 712 may provide the determined assigned resource to a resource component 716.

The apparatus 702 may include a timing-offset determining component 714 that may be configured to determine the x offset based on a timing offset between the DL carrier 780 and a GNSS time. In one aspect, the timing-offset determining component 714 may determine the x offset based on one or more TTIs of the second sidelink carrier 791, for example, based on comparing timing of the DL carrier 780 and/or the UL carrier 781 to timing (e.g., TTIs) of the second sidelink carrier 791.

The apparatus 702 may include a resource component 716 that, in junction with the transmission component 710, communicate with a second UE via the second sidelink carrier 791 using the granted resources. For example, the resource component 716 may receive an indication of determined assigned resources from the grant component 712, and the resource component 716 may further receive a timing offset (e.g., x offset) from the timing-offset determining component 714. The resource component 716 may determine to communicate via the second sidelink carrier 791 on the assigned resources based on the timing offset (e.g., x offset). The resource component 716 may further determine to communicate via the second sidelink carrier 791 based on a resource grant offset (e.g., z offset). The resource grant offset may be a predetermined value, may be received from the base station 750, or the resource component 716 may determine the resource grant offset (e.g., by comparing timing (e.g., subframes) of the second sidelink carrier 791 to timing (e.g., subframes) of the DL carrier 780 and/or UL carrier 781. Thus, in an aspect, the resource component 716 may identify at least one offset and apply the at least one offset to an $n^{th}$ subframe of the DL carrier 780 in which the resource grant is received, for example, so that the transmission component 710 transmits data on the assigned resources beginning at the $n^{th}$+z+x subframe of the second sidelink carrier 791.

The apparatus may include additional components that perform each of the blocks of the algorithm in the aforementioned flowcharts of FIG. 6. As such, each block in the aforementioned flowcharts of FIG. 6 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 8:
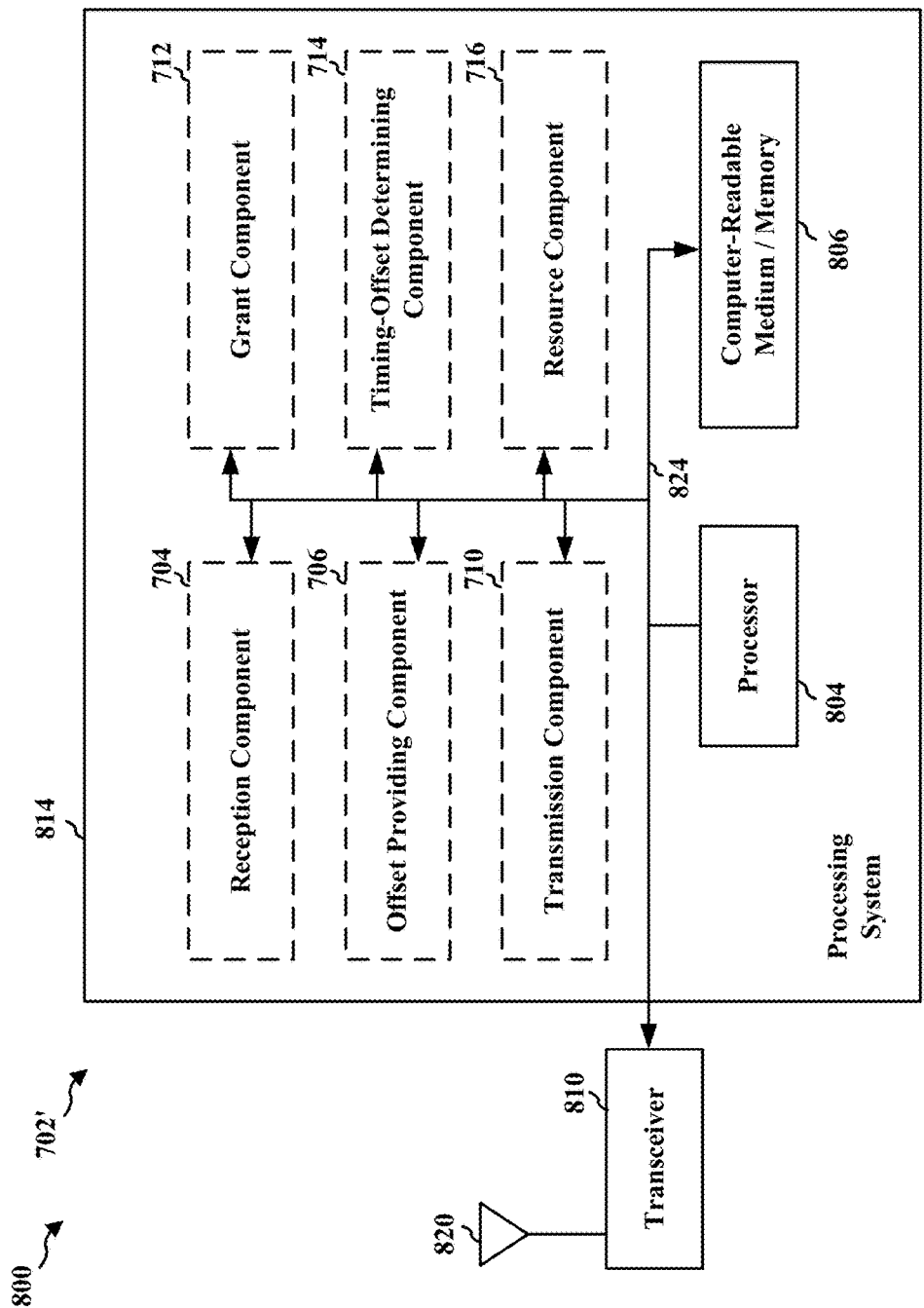
FIG. 8 is a diagram illustrating an example of a hardware implementation for an apparatus employing a processing system.

FIG. 8 is a diagram 800 illustrating an example of a hardware implementation for an apparatus 702' employing a processing system 814. The processing system 814 may be implemented with a bus architecture, represented generally by the bus 824. The bus 824 may include any number of interconnecting buses and bridges depending on the specific application of the processing system 814 and the overall design constraints. The bus 824 links together various circuits including one or more processors and/or hardware components, represented by the processor 804, the components 704, 706, 710, 712, 714, 716, and the computer-readable medium/memory 806. The bus 824 may also link various other circuits such as timing sources, peripherals, voltage regulators, and power management circuits, which are well known in the art, and therefore, will not be described any further.

The processing system 814 may be coupled to a transceiver 810. The transceiver 810 is coupled to one or more antennas 820. The transceiver 810 provides a means for communicating with various other apparatus over a transmission medium. The transceiver 810 receives a signal from the one or more antennas 820, extracts information from the received signal, and provides the extracted information to the processing system 814, specifically the reception component 704. In addition, the transceiver 810 receives information from the processing system 814, specifically the transmission component 710, and based on the received information, generates a signal to be applied to the one or more antennas 820. The processing system 814 includes a processor 804 coupled to a computer-readable medium/memory 806. The processor 804 is responsible for general processing, including the execution of software stored on the computer-readable medium/memory 806. The software, when executed by the processor 804, causes the processing system 814 to perform the various functions described supra for any particular apparatus. The computer-readable medium/memory 806 may also be used for storing data that is manipulated by the processor 804 when executing software. The processing system 814 further includes at least one of the components 704, 706, 710, 712, 714, 716. The components may be software components running in the processor 804, resident/stored in the computer readable medium/memory 806, one or more hardware components coupled to the processor 804, or some combination thereof. The processing system 814 may be a component of the UE 350 and may include the memory 360 and/or at least one of the TX processor 368, the RX processor 356, and the controller/processor 359.

In one configuration, the apparatus 702/702' for wireless communication includes means for receiving, by a first UE, a resource grant on a first carrier for a second carrier, the resource grant assigning resources for the second carrier. The apparatus 702/702' may further include means for communicating with a second UE via the second carrier using the granted resources. In an aspect, the resource grant assigns resources for the second carrier by indicating a number of channels on the second carrier.

The apparatus 702/702' may further include means for receiving, by the first UE, information carried on a PDCCH on the first carrier, wherein the information carried on the PDCCH indicates the resource grant.

The apparatus 702/702' may further include means for receiving, by the first UE, information comprising a plurality of indices and a mapping of the plurality of indices to a plurality of frequency bands for the second carrier. In an aspect, the information comprising the plurality of indices and the mapping is received via RRC signaling in response to the first UE indicating a start of vehicle-to-everything communication. In an aspect, at least a portion of the plurality of frequency bands for the second carrier corresponds to an ITS frequency spectrum for a sidelink carrier.

In an aspect, the resource grant is received at an $n^{th}$ downlink subframe of the first carrier, the granted resources are valid for an $n^{th}$+z offset+x offset subframe of the second carrier, the z offset is associated with a resource grant offset, and the x offset is associated with a timing offset between the first carrier and the second carrier. In an aspect, the x offset is associated with an offset between a SFN 0 of the first carrier and an SFN 0 of the second carrier.

The apparatus 702/702' may further include means for receiving, by the first UE, the x offset via RRC signaling. The apparatus 702/702' may further include means for determining, by the first UE, the x offset based on a timing offset between the first carrier and a GNSS time. The apparatus 702/702' may further include means for determining, by the first UE, the x offset based on a transmission time interval of the second carrier. The apparatus 702/702' may further include means for receiving, by the first UE, a request for the x offset; and means for providing, by the first UE, the x offset via RRC signaling. The apparatus 702/702' may further include means for autonomously providing the x offset via RRC signaling.

The aforementioned means may be one or more of the aforementioned components of the apparatus 702 and/or the processing system 814 of the apparatus 702' configured to perform the functions recited by the aforementioned means. As described supra, the processing system 814 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method for wireless communication, comprising:
    receiving, by a first user equipment (UE), a resource grant on a first carrier for a second carrier, the resource grant assigning resources for the second carrier; and
    communicating with a second UE via the second carrier using the granted resources,
    wherein the resource grant is received at an $n^{th}$ downlink subframe of the first carrier, wherein the granted resources are valid for an $n^{th}$+z offset+x offset subframe of the second carrier,
    wherein the z offset is associated with a resource grant offset, and
    wherein the x offset is associated with a timing offset between the first carrier and the second carrier.

2. The method of claim 1, wherein,
    the resource grant assigns resources for the second carrier by indicating a number of channels on the second carrier.

3. The method of claim 1, further comprising:
    receiving, by the first UE, information carried on a Physical Downlink Control Channel (PDCCH) on the first carrier, wherein the information carried on the PDCCH indicates the resource grant.

4. The method of claim 1, further comprising receiving, by the first UE, information comprising a plurality of indices and a mapping of the plurality of indices to a plurality of frequency bands for the second carrier.

5. The method of claim 4, wherein the information comprising the plurality of indices and the mapping is received via Radio Resource Control (RRC) signaling in response to the first UE indicating a start of vehicle-to-everything communication.

6. The method of claim 4, wherein at least a portion of the plurality of frequency bands for the second carrier corresponds to an Intelligent Transport System frequency spectrum for a sidelink carrier.

7. The method of claim 1,
    wherein the x offset is associated with an offset between a System Frame Number (SFN) 0 of the first carrier and an SFN 0 of the second carrier.

8. The method of claim 1, further comprising receiving, by the first UE, the x offset via Radio Resource Control (RRC) signaling.

9. The method of claim 1, further comprising:
    determining, by the first UE, the x offset based on a timing offset between the first carrier and a global navigation satellite system (GNSS) time.

10. The method of claim 9, further comprising:
    determining, by the first UE, the x offset based on a transmission time interval of the second carrier.

11. The method of claim 1, further comprising:
    receiving, by the first UE, a request for the x offset; and
    providing, by the first UE, the x offset via Radio Resource Control (RRC) signaling.

12. The method of claim 1, further comprising:
    autonomously providing, by the first UE, the x offset via Radio Resource Control (RRC) signaling.

13. An apparatus for wireless communication, comprising:
    means for receiving, by a first user equipment (UE), a resource grant on a first carrier for a second carrier, the resource grant assigning resources for the second carrier; and
    means for communicating with a second UE via the second carrier using the granted resources,
    wherein the resource grant is received at an $n^{th}$ downlink subframe of the first carrier,
    wherein the granted resources are valid for an $n^{th}$+z offset+x offset subframe of the second carrier,
    wherein the z offset is associated with a resource grant offset, and
    wherein the x offset is associated with a timing offset between the first carrier and the second carrier.

14. The apparatus of claim 13, wherein,
    the resource grant assigns resources for the second carrier by indicating a number of channels on the second carrier.

15. The apparatus of claim 13, further comprising:
    means for receiving, by the first UE, information carried on a Physical Downlink Control Channel (PDCCH) on the first carrier, wherein the information carried on the PDCCH indicates the resource grant.

16. The apparatus of claim 13, further comprising:
    means for receiving, by the first UE, information comprising a plurality of indices and a mapping of the plurality of indices to a plurality of frequency bands for the second carrier.

17. The apparatus of claim 16, wherein the information comprising the plurality of indices and the mapping is received via Radio Resource Control (RRC) signaling in response to the first UE indicating a start of vehicle-to-everything communication.

18. The apparatus of claim 16, wherein at least a portion of the plurality of frequency bands for the second carrier corresponds to an Intelligent Transport System (ITS) frequency spectrum for a sidelink carrier.

19. The apparatus of claim 13,
    wherein the x offset is associated with an offset between a System Frame Number (SFN) 0 of the first carrier and an SFN 0 of the second carrier.

20. The apparatus of claim 13, further comprising:
    means for receiving, by the first UE, the x offset via Radio Resource Control (RRC) signaling.

21. The apparatus of claim 13, further comprising:
    means for determining, by the first UE, the x offset based on a timing offset between the first carrier and a global navigation satellite system (GNSS) time.

22. The apparatus of claim 21, further comprising:
    means for determining, by the first UE, the x offset based on a transmission time interval of the second carrier.

23. The apparatus of claim 13, further comprising:
    means for receiving, by the first UE, a request for the x offset; and means for providing, by the first UE, the x offset via Radio Resource Control (RRC) signaling.

24. The apparatus of claim 13, further comprising:
means for autonomously providing the x offset via Radio Resource Control (RRC) signaling.

25. An apparatus for wireless communication, comprising:
a memory; and
at least one processor coupled to the memory and configured to:
receive a resource grant on a first carrier for a second carrier, the resource grant assigning resources for the second carrier; and
communicate with a second UE via the second carrier using the granted resources,
wherein the resource grant is received at an $n^{th}$ downlink subframe of the first carrier,
wherein the ranted resources are valid for an $n^{th}$+z offset+x offset subframe of the second carrier,
wherein the z offset is associated with a resource rant offset, and
wherein the x offset is associated with a timing offset between the first carrier and the second carrier.

26. The apparatus of claim 25, wherein,
the resource grant assigns resources for the second carrier by indicating a number of channels on the second carrier.

27. A non-transitory computer-readable medium storing computer executable code for wireless communication, the code when executed by a processor causing the processor to:
receive, by a first user equipment (UE), a resource grant on a first carrier for a second carrier, the resource grant assigning resources for the second carrier; and
communicate with a second UE via the second carrier using the granted resources, wherein the resource grant is received at an $n^{th}$ downlink subframe of the first carrier,
wherein the granted resources are valid for an $n^{th}$+z offset+x offset subframe of the second carrier,
wherein the z offset is associated with a resource grant offset, and
wherein the x offset is associated with a timing offset between the first carrier and the second carrier.

* * * * *